Aug. 9, 1966     E. B. LIVINGSTON     3,265,087
HOSE SUPPORTING BOOM FOR CAR WASHING INSTALLATIONS
Filed Jan. 27, 1964     3 Sheets-Sheet 1
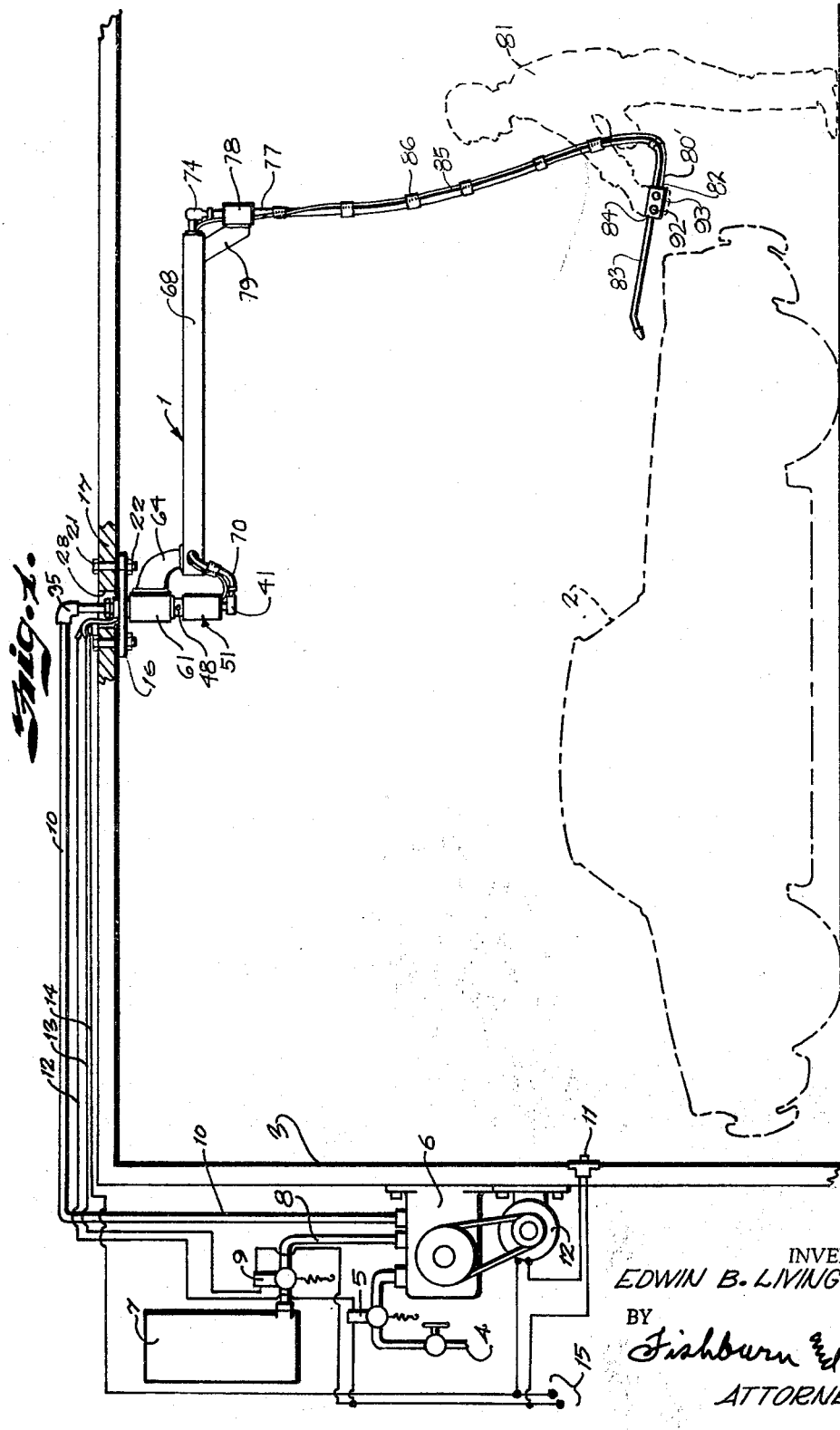
INVENTOR.
EDWIN B. LIVINGSTON
BY
Fishburn & Gold
ATTORNEYS

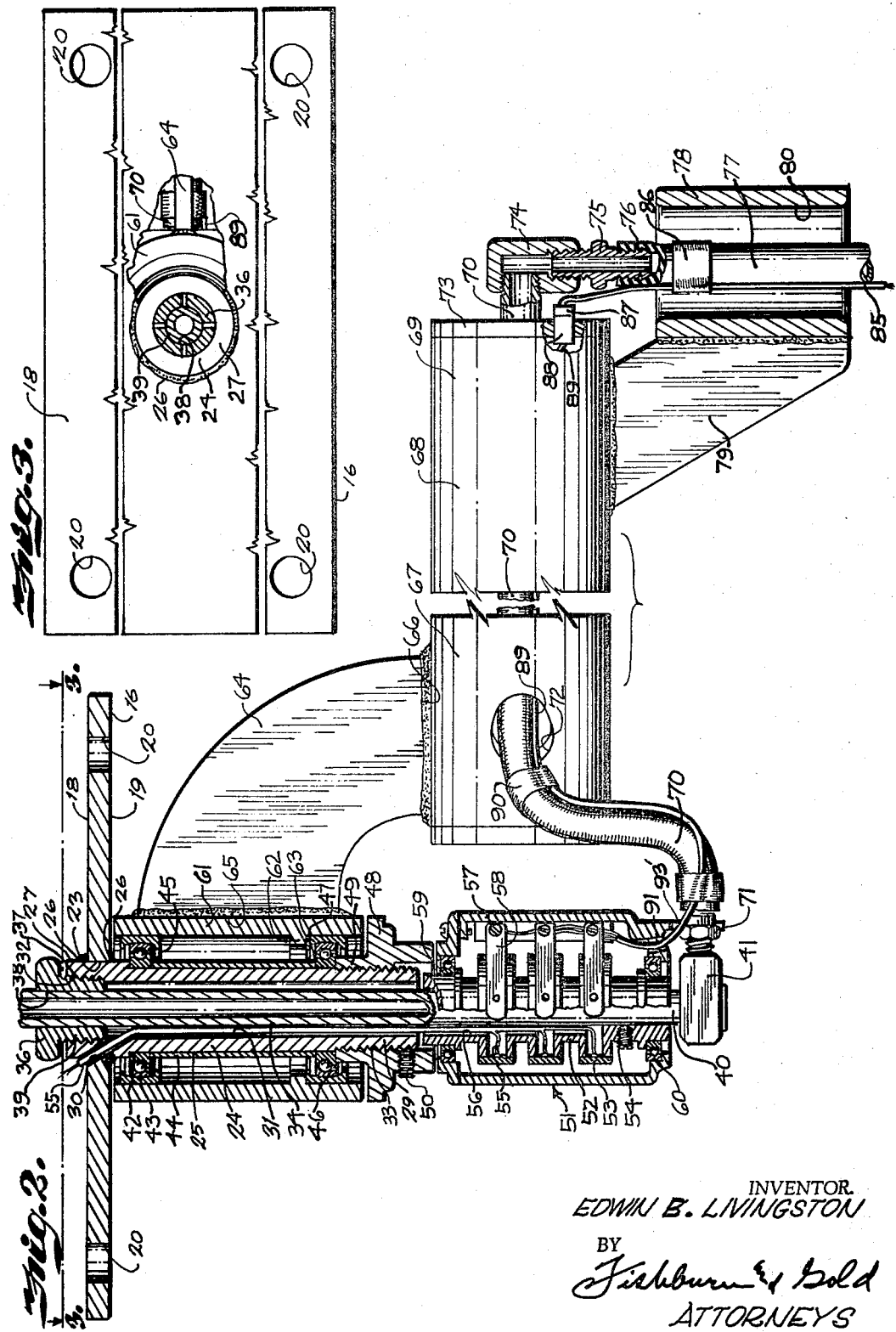

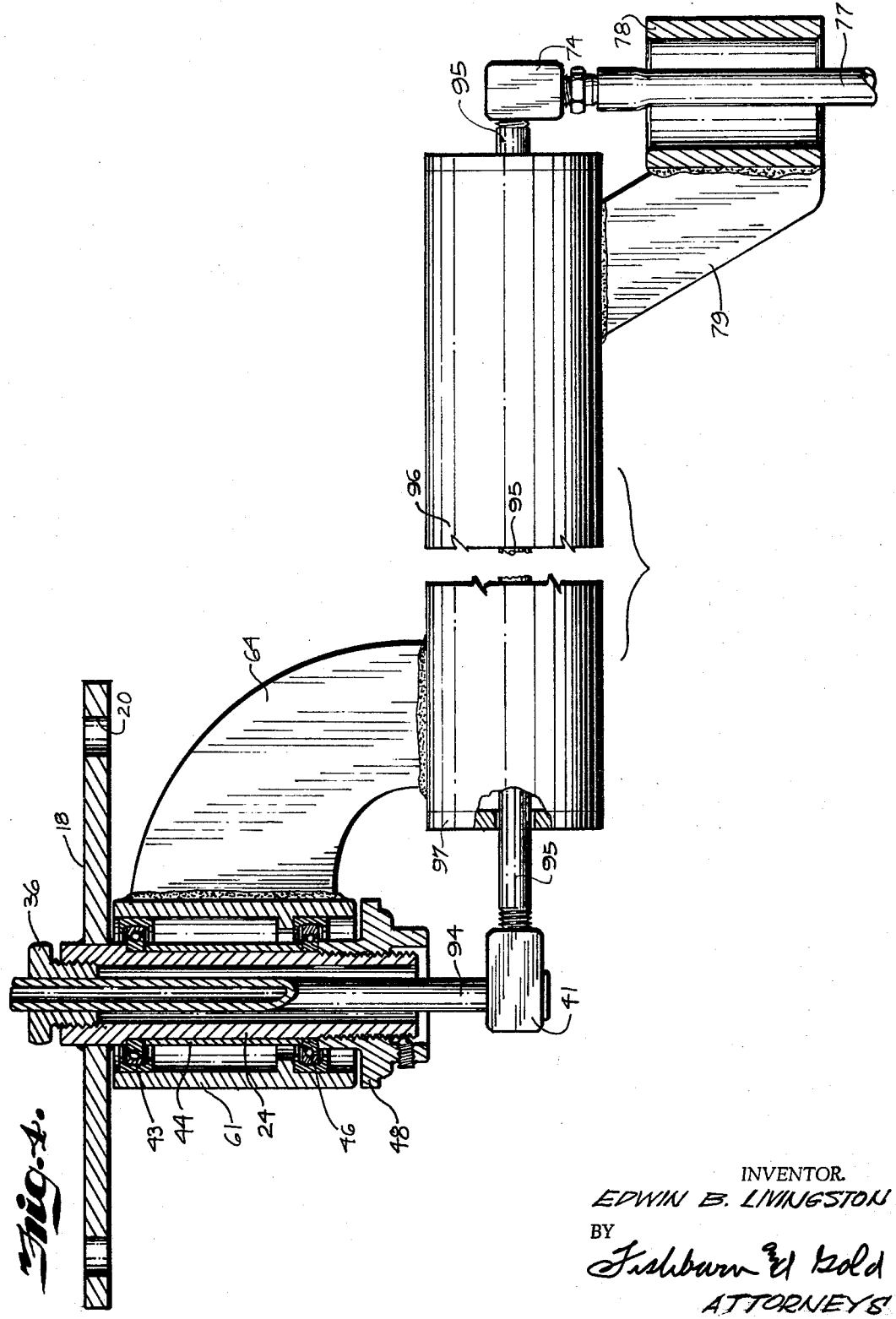

United States Patent Office 3,265,087
Patented August 9, 1966

3,265,087
HOSE SUPPORTING BOOM FOR CAR
WASHING INSTALLATIONS
Edwin B. Livingston, 1735 Walnut, Jackson County, Mo.
Filed Jan. 27, 1964, Ser. No. 340,194
6 Claims. (Cl. 137—560)

This invention relates to supporting apparatus, and more particularly to a new and improved swivel structure.

The principal objects of the present invention are: to provide a swivel boom structure particularly adapted for supporting a hose having a nozzle whereby the nozzle may be conveniently directed to desired locations for efficient spraying of chemicals, water and the like; to provide such a device which eliminates the annoyance of a hose lying on the ground and becoming entangled; to provide such apparatus which avoids inconvenient and easily broken wall connections for washing hoses; to provide such apparatus which permits electrical control signals to be transmitted through the same swivel joint with fluids under pressure whereby an operator may conveniently simultaneously control pumps for maintaining desired pressure or composition of fluid in the hose while directing the spray issuing from the hose nozzle; to provide such apparatus which is easily installed overhead on ceiling beams and the like; and to provide such apparatus which is simple and rugged in construction and durable in use.

Other objects and advantages of this invention will become apparent from the following description taken in connection with the accompanying drawings wherein are set forth by way of illustration and example certain embodiments of this invention.

FIG. 1 is a partially schematic view in side elevation illustrating a vehicle washing installation embodying this invention and showing an operator and a vehicle in broken lines.

FIG. 2 is a fragmentary vertical cross-sectional view through apparatus embodying this invention on an enlarged scale particularly showing the relationship between the electrical signal conducting portions and fluid carrying portions.

FIG. 3 is a fragmentary cross-sectional view taken on the line 3—3, FIG. 2, particularly showing a mounting plate and a stationary fluid carrying tube extending therethrough.

FIG. 4 is a vertical cross-sectional view through a modified form of apparatus embodying this invention which does not have an electrical signal transmitting portion.

Referring to the drawings in more detail:

The reference numeral 1 generally indicates boom apparatus for washing a vehicle designated by the broken lines at 2 parked within a suitable enclosure 3 which may be part of a conventional automobile service station building or a structure devoted specifically to washing and cleaning automobiles. The apparatus 1 is particularly useful as a part of self-service installations wherein a person temporarily parks his automobile and pays a specified fee allowing him a limited length of time for personally using cleaning and washing equipment provided. In such installations, for example, a source of water, which may be heated by conventional equipment (not shown) if desired, is directed through a pipe 4 past a suitable electrically operated solenoid valve 5 into a pump 6 for increasing the pressure thereof to produce a high velocity washing spray. Also included, by way of example, is a suitable tank 7 in which cleaning chemicals such as liquid detergents are contained, the tank 7 communicating with a discharge pipe 8 in which is located an electrically operated solenoid valve 9 for controlling the flow from the tank through the pipe 8. The pipe 8 also communicates with the pump 6 and it is to be understood that the pump 6 is adapted to mix the input from the pipes 4 and 8 so that when both the valves 5 and 9 are open a cleaning mixture of detergent and water is directed at high pressure through a conduit or pipe 10 forming the output of the pump. However, when only the solenoid valve 5 is operated, clear rinsing water is directed through the pipe 10 under the desired high pressure. A suitable switch 11 actuates a motor 12 for driving the pump 6 during a washing operation. Suitable electric conductors 12, 13 and 14 are used to complete circuits as described below to operate the solenoid valves 5 and 9 through a commercially available source of electricity 15.

The apparatus 1 comprises a horizontal plate 16 mounted, in this example, on a ceiling beam 17 directly above the vehicle 2 and having an upper surface 18 engaged with the ceiling beam 17 and a lower surface 19. The plate 16 has mounting holes 20 extending therethrough for receiving suitable bolts 21 and the like engaging the ceiling beam 17 and receiving nuts 22 for firmly supporting the plate in fixed horizontal position. The plate 16 includes a central bore 23 extending vertically therethrough. A vertical elongated cylindrical sleeve 24 having a relatively thick side wall 25 extends through the bore 23 and is fixed by means of welds 26 to the plate. The sleeve 24 has an upper end 27 adjacent the plate and, in the illustrated example, extending slightly above the upper surface 18 and into an opening or bore 28 communicating through the ceiling beam 17 for this purpose. The sleeve 24 has a lower end 29 depending below the plate 16 a substantial distance from the lower surface 19. A passageway 30, in this example, extends diagonally downwardly and inwardly through the plate 16 and the sleeve side wall 25 providing access between the area above the plate upper surface 18 and the interior 31 of the sleeve. Internal threads 32 are cut in the sleeve at the sleeve upper end 27 and external threads 33 are cut into the sleeve at the sleeve lower end 29.

A fluid conducting tube 34 is connected by means of a suitable conventional tube elbow 35 to the output conduit or pipe 10 of the pump and extends coaxially downwardly through the sleeve 24. A split nut 36 having external threads 37 engages the sleeve internal threads 32 and has an internal bore 38 for receiving the tube 34 therethrough. It is to be understood that the nut 36 is of the type wherein the split threaded nipple portion 39 is tapered causing the bore 38 to decrease in diameter as the nut is received in a threaded member. The nipple portion 39 thus securely engages the tube 34 fixing same with respect to the plate 16. The tube 34 extends through and a substantial distance below the sleeve lower end 29 and terminates at the lower end 40 thereof in a right angle swivel joint 41 which may be one of several well known conventional types permitting rotation with respect to a stationary tube without leakage.

The sleeve 24 abruptly decreases in outside diameter adjacent and below the plate lower surface 19 forming a downwardly directed shoulder 42. An upper radial thrust ball bearing 43 which is preferably of the self-aligning type surrounds the sleeve 24 below the shoulder 42 and has the inner race thereof engaging the shoulder, preventing further upward movement on the sleeve. A cylindrical sleeve spacer 44 surrounds the sleeve 24 and bears at the upper end 45 thereof on the upper bearing inner race on the side opposite the shoulder 42. A second or lower radial thrust ball bearing 46 also preferably of the self-aligning type surrounds the sleeve 24 and bears at the inner race thereof on the lower end 47 of the sleeve spacer 44.

A flanged nut 48 has an internal thread engaged with the sleeve external thread 33 and includes a nipple 49 engaging the lower ball bearing 46 at the inner race thereof on the opposite side from the sleeve lower end 47. The ball bearings 43 and 46 are thereby fixed in position longitudinally of the sleeve 24. A set screw 50 is threadedly engaged with the flanged nut 48 and bears against the sleeve 24 to prevent an accidental turning of the flanged nut which may permit longitudinal movement of the bearings along the sleeve.

A slip ring assembly 51 comprises an elongated hollow shaft 52 having a plurality of electrically conductive slip rings 53 spaced axially therealong and electrically isolated from each other. The shaft 52 is received over the tube 34 below the sleeve 24 and is secured thereto by means of a suitable set screw 54. Electrical leads or conductors 55 are respectively connected to the slip rings 53 and extend upwardly within a longitudinal slot 56 formed in the shaft 52 and then upwardly between the sleeve 24 and the tube 34 and through the passageway 30 subsequently connecting to said conductors 12, 13 and 14. The slip ring assembly 51 includes a housing 57 surrounding the slip rings 53 and having a plurality of elongated resilient electrically conductive brushes 58 secured thereto and respectively slidably engaging the slip rings 53. The housing 57 is mounted for rotation about a vertical axis on the shaft 52 by spaced apart ball bearings 59 and 60. It is to be understood that the rotation of the housing 57 about the shaft 52 causes the brushes 58 to slip along the peripheral surface of the slip rings 53 but maintain electrical contact therewith.

A vertically extending structural tubular member 61 surrounds the bearings 43 and 46 and is positioned substantially between the plate lower surface 19 and the flanged nut 48. The tubular member 61 engages the outer races of the bearings 43 and 46 and has a radially inwardly projecting boss or ring 62 forming a shoulder 63 engaging the upper side of the lower ball bearing 46 preventing downward movement of the tubular member 61 with respect to the plate 16. However, free rotational movement of the tubular member 61 is permitted with respect to the plate.

A quarter-circular vertically disposed brace 64 has a vertically extending end edge 65 secured, in the illustrated example by welding, to the tubular member 61. The brace 64 includes a horizontally extending end edge 66 secured, in the illustrated example by welding, to the inner end 67 of a rigid elongated horizontally extending pipe 68. The pipe 68 includes an outer end 69 which is supported in cantilever fashion radially spaced a substantial distance from the tubular member 61, for example, 5 feet.

A fluid transmitting tube 70 is connected by means of a suitable joining nipple 71 to the swivel joint 41 and extends through a side wall opening 72 into the pipe 68 adjacent the inner end 67. The tube 70 extends longitudinally through the horizontally extending pipe 68 and exits therefrom through an outer end cap 73. A right angle pipe coupling 74 is joined to the tube 70 where it projects outwardly from the end cap 73 and a vertically extending joining nipple 75 is secured to the coupling 74 and receives one end 76 of a flexible hose 77 thereon. A cylindrical pipe section or ring member 78 loosely surrounds the flexible hose 77 adjacent the joint thereof with the nipple 75 and is rigidly supported to the pipe 68 near the outer end 69 by a brace 79 respectively welded to the pipe 68 and the ring member 78. The ring member 78 normally does not engage the flexible pipe 77 but when lateral pressure is placed on the flexible hose 77 excessive bending near the joint is prevented by contact with the interior surface 80 of the ring member 78.

The flexible hose 77, as illustrated in FIG. 1, depends to a position 80' adjacent the vehicle 2 and at a level for convenient grasping by a standing person 81. The hose 77 at the lower end 82 thereof terminates in a nozzle 83 adapted to spray high pressure liquids into a pattern for cleaning the surface of the vehicle. Located at the connection between the hose 77 and the nozzle 83 are electrical pushbutton switch controls 84 for convenient manipulation by the person 81. The switch controls 84 are connected in a conventional waterproof manner to electrical conductors 85 which are directed along the flexible hose 77 and secured thereto by means of spaced retaining members 86. The conductors 85 terminate near the pipe coupling 74 in a Jones plug 87 adapted to mate with a Jones plug receiver 88 suitably secured to the pipe outer end cap 73. The plug receiver 88 is joined to conductors 89 which extend within the pipe 68 adjacent the tube 70 and exit therewith through the opening 72. The conductors 89 are secured adjacent the tube 70 by spaced retaining members 90 similar to the members 86; however, the conductors 89 continue beyond the end of the tube 70 and enter the slip ring housing 57 at 91 and are individually connected to the brushes 58.

In operation, the person 81 grasping the nozzle 83 may depress either a pushbutton 92 or 93 while pointing the nozzle 83 toward the vehicle 2. It is to be understood that the circuit connection with the pushbuttons 92 and 93 is conventional and may assume several patterns. By selecting, for example, the pushbutton 92, after previously energizing the motor 12 by the switch 11, both the solenoid valves 5 and 9 are actuated through the slip ring assembly 51 whereby a mixture of cleaning chemical in the tank 7 and water are pumped at high pressure through the conduit or pipe 10, downwardly through the stationary tube 34, through the swivel joint 41 into the tube 70 and flexible hose 77 and out the nozzle 83. When rinsing the mixture from the automobile is desired, the pushbutton 93 is depressed which produces a signal through the slip ring assembly 51 opening only the solenoid valve 5 resulting in only rinse water being discharged under pressure from the nozzle 83. The person 81 may conveniently walk around the vehicle 2 while spraying same and the pipe 68 will act as a cantilever boom following the person to the new position without disrupting flow or electrical control. A depending portion 93' on the housing 57 engages the nipple 71 to turn the slip ring assembly 51 with the swivel joint 41. When not in use, the nozzle 83 may simply be swung to a position which does not interfere with the entry of a new vehicle.

Referring to FIG. 4, an additional embodiment of this invention is illustrated which is generally similar to the embodiment above described except that electrical signal transmission members are not provided on the hose but at a position (not shown) on a wall or the like. In the embodiment of FIG. 4, the vertical tube 94 which corresponds to the tube 34 in the embodiment of FIG. 2 is shorter since space is not needed for the slip ring assembly 51 and the tube 95, corresponding to the tube 70, enters coaxially into the pipe 96 through an inner end cap 97. The swivel action is the same as above described.

It is to be understood that while certain forms of this invention have been illustrated and described, it is not to be limited to the specific form or arrangement of parts herein described and shown except insofar as such limitations are included in the claims.

What I claim and desire to secure by Letters Patent is:

1. A fluid conducting swivel apparatus comprising: a vertically extending cylindrical sleeve having a lower end and an outside surface, means for rigidly supporting said sleeve depending from an overhead member, a fluid conducting stationary tube extending downwardly within and through said sleeve and terminating below said lower end of said sleeve in a right angle fluid conducting swivel joint, upper and lower spaced apart horizontally rotatable radial thrust bearings supported on said outside surface of said sleeve, a vertically extending tubular member surrounding said sleeve and engaging said bearings for rotating about said sleeve, means on said tubular member and engaging at least one of said bearings for vertically supporting said tubular member on said sleeve, a rigid elongated horizontally extending support member, means securing said support member to said tubular member, and a horizontal fluid conducting tube joined to said swivel joint and supported by said support member for rotating about said stationary tube therewith.

2. The structure as set forth in claim 1 wherein said means for rigidly supporting said sleeve is a horizontally extending plate having an opening therethrough coinciding with the interior of said sleeve and through which said stationary tube depends.

3. The structure as set forth in claim 1 including a stationary electrical conductor extending downwardly within said sleeve, a slip ring assembly secured to said stationary tube adjacent said sleeve lower end and having a stationary portion electrically connected to said stationary conductor, said slip ring assembly having a rotatable portion adapted for rotation with said swivel joint, and an electrical conductor supported by said supporting member and movable therewith and electrically connected to said rotatable portion for transmitting electrical signals through said swivel apparatus.

4. A hose supporting fluid conducting swivel apparatus comprising: horizontal support means for mounting on a ceiling beam and the like and having a bore extending vertically therethrough, a vertical elongated cylindrical sleeve being fixed to said support means, said sleeve communicating with said support means bore and having an upper end adjacent said support means and a lower end depending below said support means, a fluid conducting tube extending vertically within and through said sleeve, means engaging said sleeve and said tube for fixing said tube with respect to said support means, said tube extending below said sleeve lower end and terminating at the lower end thereof in a right angle tube swivel joint, a downwardly directed external shoulder on said sleeve, a first ball bearing surrounding said sleeve and having the inner race thereof engaging said shoulder preventing upward movement on said sleeve, a spacer having oppositely directed ends and bearings at one end thereof against said first bearing inner race on the side opposite said sleeve shoulder, a second ball bearing surrounding said sleeve and bearing at the inner race thereof on the other end of said spacer, means engaging said sleeve and said second ball bearing at the inner race thereof on the opposite side from said spacer for fixing said ball bearings with respect to said sleeve, a vertically extending tubular member surrounding said bearings and located below said support means, said tubular member engaging the outer races of said bearings and having an inwardly projecting shoulder engaging the upper side of one of said bearing outer races preventing downward movement of said tubular member with respect to said support means but permitting free rotational movement with respect to said support means, an elongated rigid generally horizontally extending pipe having an inner end and an outer end, a brace having a vertically extending end edge secured to said tubular member and a horizontally extending end edge secured to said pipe adjacent said pipe inner end for cantilever support of said pipe outer end at a position radially spaced from said tubular member, a fluid carrying tube connected to said swivel joint and extending into and longitudinally through said pipe and out adjacent said pipe outer end and terminating in a pipe coupling, said hose being secured to said pipe coupling and depending therefrom.

5. A hose supporting fluid conducting swivel apparatus comprising: horizontal support means for mounting on a ceiling beam and the like and having a bore extending vertically therethrough, a vertical elongated cylindrical sleeve being rigidly fixed to said support means, said sleeve communicating with said support means bore and having an upper end adjacent said support means and a lower end depending below said support means, a passageway extending downwardly through said support means and said sleeve providing access to the interior of said sleeve, a fluid conducting tube extending vertically within said sleeve, means engaging said sleeve and said tube for fixing said tube with respect to said support means, said tube extending below said sleeve lower end and terminating at the lower end thereof in a right angle tube swivel joint, a first bearing surrounding said sleeve and longitudinally fixed therealong, a second bearing surrounding said sleeve and longitudinally fixed therealong and spaced from said first bearing, a slip ring assembly comprising a hollow shaft having a plurality of electrical slip rings spaced axially therealong, said shaft being received over said tube below said sleeve and secured thereto, electrical conductors connected to said slip rings and extending upwardly past said slip ring assembly and between said tube and sleeve and out said passageway, said slip ring assembly including a housing surrounding said slip rings and having a plurality of brushes fixed thereto and respectively slidably engaging said slip rings, said housing surrounding and being rotatably mounted with respect to said hollow shaft, a vertically extending tubular member surrounding said bearings and engaged therewith for rotation about said sleeve, said tubular member being engaged with at least one of said bearings for vertical support with respect to said sleeve, an elongated rigid horizontally extending support member having an inner end and an outer end, means rigidly securing said inner end with respect to said tubular member for cantilever support of said outer end radially spaced from said tubular member, a fluid carrying tube connected to said swivel joint and extending along and being supported by said horizontally extending support member and communicating with said hose, said hose having electrical switch control means thereon, electrical conductors operably connected to said switch control means and directed along said hose and along said support member and connected to said respective brushes, and means for rotating said housing with said tubular member.

6. A fluid conducting swivel apparatus comprising: a vertically extending sleeve having a lower end, means for rigidly supporting said sleeve depending from an overhead member, a fluid conducting stationary tube extending downwardly within and through said sleeve and terminating below said lower end of said sleeve in a fluid conducting swivel joint, spaced apart horizontally rotatable radial thrust bearings supported on said sleeve, a vertically extending tubular member surrounding said sleeve and engaging said bearings for rotating about said sleeve, means cooperating between said tubular member and said sleeve for vertically rotatably supporting said tubular member on said sleeve, a rigid elongated horizontally extending support member, means securing said support member to said tubular member, and a horizontal fluid conducting tube joined to said swivel joint and supported by said support member for rotating about said stationary tube therewith.

References Cited by the Examiner

UNITED STATES PATENTS

| | | | |
|---|---|---|---|
| 601,003 | 3/1898 | Nicholsburg | 233—209 X |
| 650,483 | 5/1900 | Ryan et al. | 285—64 |
| 1,156,145 | 10/1915 | Jenkins | 285—64 |
| 1,924,428 | 8/1933 | Wilson | 233—209 |
| 2,011,375 | 8/1935 | Rohan | 233—209 |
| 2,458,967 | 1/1949 | Wiebenhoeft | 285—168 X |
| 3,072,130 | 1/1963 | Grabenhorst | 239—185 X |
| 3,208,088 | 9/1965 | Sulzberger et al. | 134—123 X |

M. CARY NELSON, *Primary Examiner.*

HENRY T. KLINKSIEK, *Examiner.*